Patented Feb. 9, 1926.

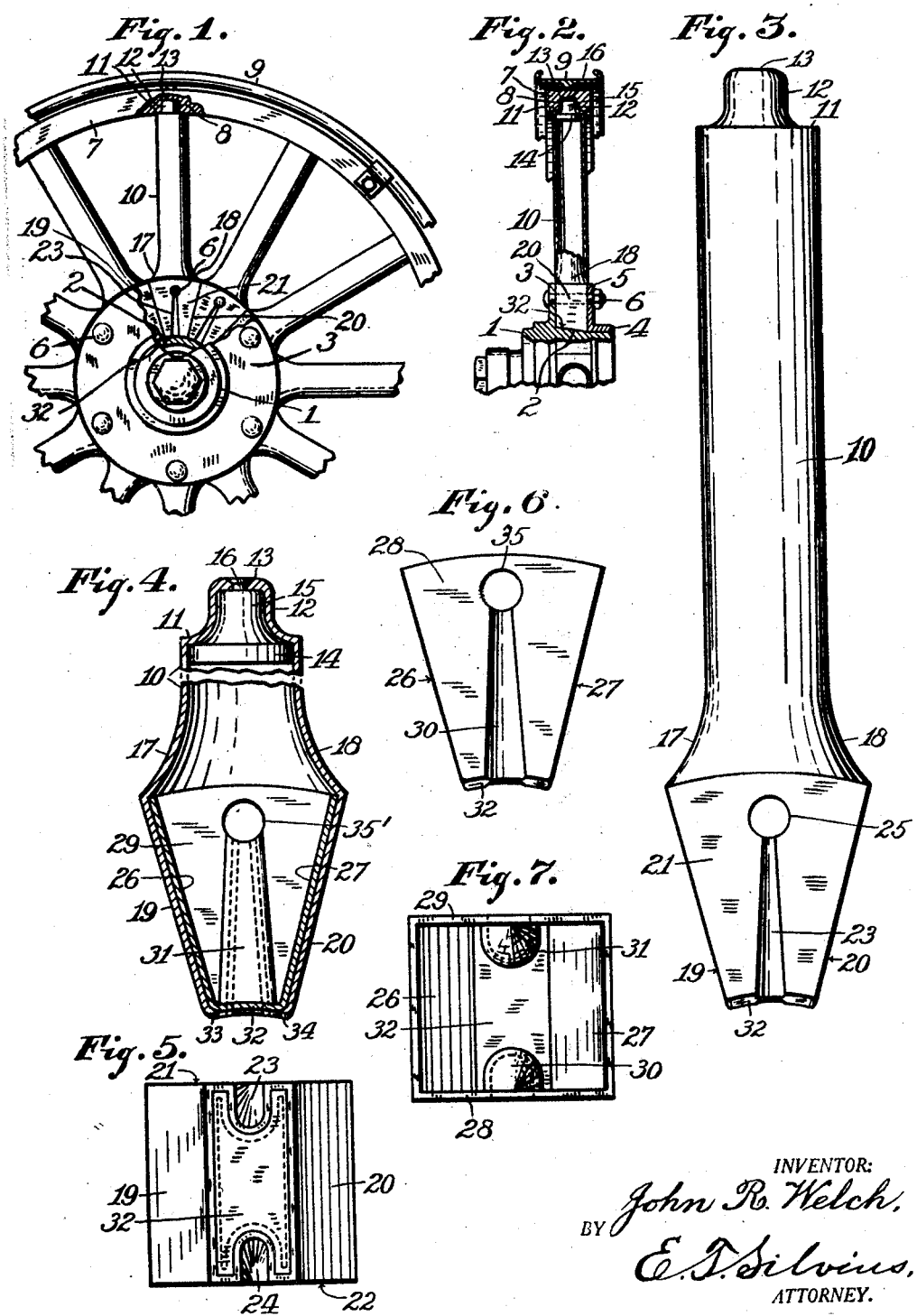

1,572,170

UNITED STATES PATENT OFFICE.

JOHN R. WELCH, OF MUNCIE, INDIANA; VIOLA M. WELCH, EXECUTRIX OF THE ESTATE OF SAID JOHN R. WELCH, DECEASED, ASSIGNOR TO VIOLA M. WELCH, OF MUNCIE, INDIANA.

METAL WHEEL SPOKE.

Application filed October 30, 1922. Serial No. 597,740.

*To all whom it may concern:*

Be it known that I, JOHN R. WELCH, a citizen of the United States, residing at Muncie, in the county of Delaware and State of Indiana, have invented a new and useful Metal Wheel Spoke, of which the following is a specification, reference being had to the accompanying drawings and to the letters and figures of reference marked thereon.

The invention relates to vehicle wheels generally and particularly to motor vehicle wheels, the invention having reference more particularly to the spokes of the wheels and especially to hollow metallic spokes composed of drawn or pressed sheet metal.

An object of the invention is to provide an improved metal wheel spoke of such construction as to be adapted to be used instead of a wooden spoke in order to conserve available supplies of timber.

Another object is to provide an improved hollow metal wheel spoke which shall be of light weight and yet strong, and which shall be of symmetrical and neat appearance and of such form as to permit it to be readily painted or otherwise artistically finished.

A further object is to provide an improved hollow metal wheel spoke that shall be slightly elastic laterally and will not be liable to be injured in minor accidents nor to be destructibly damaged in serious accidents, but which shall be reliable, durable and economical in use and be adapted to be readily replaced by a new spoke in case of necessity.

With the above-mentioned and other objects in view, the invention consists in a novel hollow metal wheel spoke having an improved laminated sector and also an improved end for connection with a wheel felly; and, the invention consists also further in the novel parts and features of construction, and in the combinations and arrangements of parts, as hereinafter particularly described and further set forth in the claims appended hereto.

Referring to the drawings,—Figure 1 is a fragmentary front view of a vehicle wheel provided with the improved metal spokes; Fig. 2 is a fragmentary section of the wheel, particularly one of the spokes shown in connection with parts of the wheel in detail; Fig. 3 is a side view of a complete spoke on an enlarged scale; Fig. 4 is a longitudinal central section of the improved spoke partially broken away; Fig. 5 is an end view of the improved spoke, particularly the end of the sector portion thereof; Fig. 6 is a side view of the reinforcing laminating part of the sector portion of the spoke; and, Fig. 7 is an end view of the laminating portion of the spokes, viewing the larger end thereof.

In the various figures of the drawings similar reference characters indicate corresponding elements or features of construction hereinafter referred to more particularly in detail.

A portion of a vehicle wheel is illustrated and briefly described as explanatory of the purpose of the improved spoke and the practical application thereof, the wheel having a well known type of hub 1 which has a tapered spoke seat 2 and a flange 3 at the larger end of the seat against which to clamp the spokes, by means of a collar 4 arranged at the smaller end of the spoke seat and having a flange 5 thereon, a suitable number of bolts 6 being connected with the flanges to secure the sector portion of the spokes to the hub. The wheel has a suitable felly 7 which has spoke sockets 8 therein and may have any suitable tire thereon which may be secured in place by means of a demountable rim 9.

All the spokes in a wheel are alike, each spoke comprising a drawn seamless tubular metal body portion 10, uniform in diameter having an annular end portion 11 integral therewith adapted to be seated against a felly and from which extends integrally a hollow dowel 12 having a head portion 13 integral therewith, the dowel being adapted to be inserted in a socket 8. Preferably the outer end of the spoke is reinforced by means of a liner having a cylindrical main portion 14 pressed tightly into the body portion 10 to the end 11 and from which extends a dowel portion 15 which is integral therewith and seated against the head 13 and preferably has a stud 16 thereon which extends through a suitable hole in the head and is riveted over to hold the liner in place. The liner may be either solid or hollow as may be preferred. The spoke has two oppositely flared portions 17 and 18 extending integrally from the body portions, being seamless and the necessary sector portion of the spoke comprises two flat seamless sector plates 19 and 20 extending integrally from the ends of the flared portions respectively and convergently, each plate relatively to the other, each sector portion having flat tapered seamless side plates 21 and 22 oppositely arranged and connected integrally with the body portion 10 and the plates 19 and 20. The side plates 21 and 22 have tapered inwardly pressed reinforcing portions 23 and 24 respectively, to constitute stiffening ribs on the inner side of the plates, and are formed integrally of surplus metal of the plates when the other plates 19 and 20 are drawn in each toward the other to form a tapered sector portion. Each plate 21 and 22 has a bolt hole 25 therein approximately at the narrower end of the stiffening rib.

The laminating part of the sector portion preferably is composed of a single sheet of metal and pressed to shape, or in some cases may be composed of a piece of tubing and pressed to the desired shape, the part having two sector plates 26 and 27 and also two side plates 28 and 29 integrally connected therewith and having inwardly pressed tapered rib portions 30 and 31 respectively, and an end plate 32 integrally connected with all the plates and closing the smaller end of the sector portion. The laminating part is placed in the partially formed sector portion and the plates 19 and 20 are afterwards drawn in against the plates 26 and 27 and so as to constitute a wedge shape sector portion. The plates 28 and 29 have bolt holes 35 and 35' to receive the clamp bolt 6 which, when the spokes are seated on the hub, extends through the holes 25. When the sector portion is practically completed, the ends of the plates 19 and 20 preferably are pressed over to constitute lips 33 and 34 against the outer portion of the end plate 32. The end plate 32 is slightly inclined so as to conform to the tapered spoke seat 2 for forcing the spokes against the felly and insuring tightly fitting spokes.

In practical use, the spokes being seamless without ribs in their body portions are slightly elastic laterally and not liable to become cracked as a result of vibrations in operation of the wheel, and they safely carry the load imposed upon them; and being tightly assembled and firmly secured to the wheel hub and thereby forced to the felly, the spokes are not liable to become loose and noisy in motion.

Having thus described the invention, what is claimed as new is:—

1. A metal wheel spoke including a tubular body portion and a transversely rectangular hollow sector portion, each of two opposite sides of the sector portion having a longitudinal seamless tapered reinforcing rib integral with the inner side thereof.

2. A metal wheel spoke including a hollow body portion and a transversely rectangular hollow sector portion, each of two opposite sides of the sector portion being seamless and having a seamless reinforcing rib pressed up and integral with the inner side thereof.

3. A metal wheel spoke including a hollow body portion with an end closure and a hollow seamless plate sector portion composed of one piece of drawn metal, the sector portion being wedge-shaped, and a seamless laminating part composed of a separate piece of drawn metal and secured to the sector portion of the spoke, the sector portion and the laminating part having pressed-up ribs.

4. A metal wheel spoke having a hollow body portion and a hollow sector portion composed of one piece of drawn metal, two opposite sides of the sector portion having each a longitudinal rib integral with the inner side thereof, each rib having a groove in its outer side.

5. A metal wheel spoke including a hollow body portion, and a hollow sector portion having four seamless side plates integrally connected together, two of the plates extending convergently each towards the other from the body portion, the remaining side plates having each a longitudinal pressed up portion on the inner side thereof.

6. A metal wheel spoke including a tubular body portion and a hollow sector portion and also a dowel composed of one piece of drawn sheet metal, and a seamless laminating part composed of a separate piece of metal and secured in the sector portion of the spoke, the laminating part having a relatively inclined end plate integral therewith and constituting the end of the sector portion, each of two opposite sides of the laminating part having a longitudinal rib integral with the inner side thereof.

In testimony whereof, I affix my signature on the 14th day of October, 1922.

JOHN R. WELCH.